United States Patent Office 3,441,576
Patented Apr. 29, 1969

3,441,576
PROCESS FOR THE RECOVERY OF NAPHTHO-
QUINONE FORMED IN THE CATALYTIC
VAPOR PHASE OXIDATION OF NAPH-
THALENE
Berndt Sigurd Berndtsson, Goteborg, Sweden, assignor to
Svenska Oljeslageri Aktiebolaget, Molndal, Sweden, a
corporation of Sweden
No Drawing. Filed Dec. 22, 1964, Ser. No. 420,454
Claims priority, application Great Britain, Dec. 23, 1963,
50,690/63
Int. Cl. C07c 45/04, 49/66; C07d 5/00
U.S. Cl. 260—396          4 Claims

ABSTRACT OF THE DISCLOSURE

The invention involves a process for the recovery of naphthoquinone formed in the catalytic vapor phase oxidation of naphthalene by feeding the vapors formed by such oxidation to a water scrubber wherein the water temperature is not below 30° C. and does not exceed 75° C., and recovering the naphthoquinone precipitated from the scrubber water.

---

This invention relates to improvements in or relating to the recovery of naphthoquinone formed in the catalytic vapor phase oxidation of naphthalene.

In the catalytic vapor phase oxidation of naphthalene phthalic anhydride, naphthoquinone and sometimes maleic anhydride are formed and varying amounts of unreacted naphthalene may also present in the gaseous reaction mixtures. This method has been used for a long time for the preparation of phthalic anhydride. The recovery of phthalic anhydride is usually made by cooling the vapors in a condenser system to a temperature of about 30–40° C. the organic products formed being condensed. The vapors leaving the condenser system are then often passed through a water scrubber in order to prevent any inconvenience to the surroundings. In connection with this subsequent scrubbing of the vapor it is possible to recover from the scrubber water certain amounts of naphthoquinone formed as a byproduct at the naphthalene oxidation said naphthoquinone being isolated by filtration of the scrubber water. The gases passed to the scrubber also contain some phthalic anhydride.

Depending on the nature of the catalyst used the gases from the naphthalene oxidation may contain naphthalene which has not reacted at the catalytic vapor phase oxidation. Since it is desired to keep the scrubber temperature as low as possible there is a risk that the naphthoquinone recovered from the scrubber water on filtration will be contaminated by naphthalene since naphthalene is also insoluble in water. At the same time there is a risk for contamination by phthalic anhydride or phthalic acid partly due to the fact that the solubility of the acid in cold water is relatively low and partly due to the fact that the hydration of the anhydride to the acid at room temperature takes place relatively slowly. The contamination by phthalic anhydride may be considerable since the phthalic anhydride in the condensor system, in the presence of naphthoquinone, has a tendency to form relatively small crystals which are not deposited in the condenser system but passes together with the naphthoquinone, both being in the form of a dust, to the scrubber.

The above-mentioned contamination problems are especially serious in the catalytic vapor phase oxidation of naphthalene if a catalyst is used with the aim to give a high yield of naphthoquinone. The yield may in such cases amount to about 20–40 percent by weight of naphthoquinone calculated on the naphthalene starting material. When naphthoquinone yields of such a high order are obtained the amount of unreacted naphthalene will also be considerable and may be about 20–30 percent by weight or more calculated on the naphthalene starting material.

The recovery of naphthoquinone from a mixture of naphthoquinone, phthalic anhydride (or phthalic acid) and naphthalene in this process, regardless of the fact whether said mixture is obtained in the condenser system or in the subsequent scrubber system, has presented serious problems whose solution has been the object of many different suggestions. Typical examples thereof are those methods in which the scrubber operates with an organic solvent or in which the acid is recovered from the products obtained in the condenser system by neutralisation with an aqueous solution of sodium carbonate or bicarbonate with subsequent separation of the naphthoquinone from the naphthalene by recrystallisation. Another suggestion is to treat the mixture of the solid products in water close to the boiling point of water by utilising the melting point depression obtained in a mixture of naphthoquinone and naphthalene. Said mixture of naphthoquinone and naphthalene is obtained in the form of a motion liquid phase separated from another liquid phase consisting of water and dissolved phthalic acid. The naphthoquinone-naphthalene mixture is then worked up for instance by recrystallisation.

The above-mentioned methods of course lead to many complications due to the fact that a large number of operations have to be performed and/or that expensive organic solvents have to be used.

The present invention provides a process in which said problems are considerably reduced. Thus, according to the invention it has been found that the above-mentioned problems can be solved by feeding the vapors from the catalytic vapor phase oxidation to a scrubber containing warm water and a subsequent recovering of the naphthoquinone from the scrubber water. In this way a naphthoquinone, substantially free from naphthalene and other impurities can be obtained in only one operation and also avoiding the use of an expensive organic solvent.

Calculating the partial pressures of the different components in the vapors as a function of their concentration in air the data stated in Table 1 are obtained. The concentration is expressed as grams of product per 30 grams of air since said relation between naphthalene and air is commonly used in the catalytic gas phase oxidation of naphthalene. In the same table also the dew points of the products in question are given. Thus, said data defines the temperature at which the products in question are precipitated when cooling the vapors in a condenser system.

In Tables 2–4 similar calculations have been made for vapors which have been passed through a scrubber operating with water having a temperature of 60° C., 50° C. and 30° C., respectively.

In Table 5 the solubility at different temperatures of phthalic acid in water is shown.

From Table 1 it can be seen that vapors containing, e.g., 0.4 gram of naphthoquinone, 0.3 gram of naphthalene and 0.3 gram of phthalic anhydride per 30 grams of air on precipitation in a condenser system by lowering the temperature to 40° C. give the substances in question in the following percentages:

| | Percent |
|---|---|
| Naphthalene, 0.3—0.05=0.25 gram | 26 |
| Naphthoquinone, 0.4—0.003=0.4 gram | 43 |
| Phthalic anhydride, 0.3—0.015=0.29 gram | 31 |

The relation between naphthalene and naphthoquinone is the following:

| | Percent |
|---|---|
| Naphthalene, 0.25 gram | 38.5 |
| Naphthoquinone, 0.4 gram | 61.5 |
| | 100.0 |

If instead these vapors are passed through a scrubber operating with a water temperature of 20° C. the proportions between naphthalene and naphthoquinone are not significantly altered, and furthermore the product will be contaminated by varying amounts of phthalic anhydride or phthalic acid depending on the amounts of water fed to the scrubber.

On the other hand when passing the vapors through a scrubber operating at such a moderate water temperature as for instance 60° C. it can be seen from the data stated in Table 2 that the proportion between naphthalene and naphthoquinone in the product obtained in the scrubber will be the following:

| | Percent |
|---|---|
| Naphthalene, 0.3—0.3=0 gram | 0 |
| Naphthoquinone, 0.4—0.0135=0.38 gram | 100 |

The phthalic anhydride introduced into the scrubber simultaneously with the other vapors is hydrated at a relatively rapid rate and the solubility in water at said temperature, i.e., about 60° C. is sufficiently high to eliminate contamination of the naphthoquinone filtered off from the scrubber water.

For practical reasons the temperature of the scrubber water should be kept somewhat higher than the temperature at which the naphthalene precipitates since loss of heat to the surroundings may cause precipitation of naphthalene on the scrubber walls. Of course, this risk is especially great when working with relatively high scrubber temperatures. However, it is not suitable to use scrubber water having too high a temperature, partly due to economical reasons and partly due to undesired chemical reactions and increased losses. Thus, according to the invention, the temperature of the scrubber water should preferably not exceed about 70° C.

By a proper choice of the scrubber water temperature in relation to the naphthalene concentration in the vapors fed to the scrubber (which is easily determined analytically) it is thus possible to obtain directly from the scrubber a naphthoquinone which is completely or almost completely free from naphthalene. In a similar manner by control of the water temperature and taking the water capacity of the scrubber into account it is also possible to achieve conditions giving naphthoquinone which in addition is free from phthalic acid or contains considerably reduced amounts of phthalic acid.

As can be seen from Table 2 the losses of naphthoquinone are very small also at a temperature of 60° C.

The above-mentioned temperatures, at which the scrubber preferably is operated, are relatively low and are not objectionable from a practical point of view. Even with naphthalene concentrations of 0.5 gram per 30 grams of air it is not necessary to use a higher temperature than about 65° C.

In order to recover the naphthalene present in the vapors leaving the scrubber it is suitable to treat said gases in a second scrubber operating with cold water, in which the major part of the naphthalene can be precipitated, filtered off and recovered.

By cooling the water from the first scrubber after filtering off the naphthoquinone it is also possible, if desired, to recover some phthalic acid.

For hygienic, heat technical and economical reasons it is desirable to keep the scrubber temperature as low as possible. As can be seen from the tables this can be achieved by lowering the naphthalene concentration (as well as the concentration of the other components of the vapor mixture). Said concentrations are primarily fixed within relatively narrow limits by the operating conditions of the catalyst used but it is possible to achieve a lowering of the concentration by diluting the vapor mixture with air prior to its entering the scrubber. For instance, if a vapor mixture containing 0.3 gram of naphthalene per 30 grams of air is diluted with an equivalent amount of air so as to lower the naphthalene concentration to 0.15 gram per 30 grams of air, a decrease of the minimum temperature in the scrubber from about 60° C. to about 50° C. is made possible without any risk of naphthalene precipitation. This is evident from Tables 2 and 3. This means, however, that the scrubber system has to have an accordingly larger size which causes greater losses of different kinds and thus it is necessary to calculate the dimensions of the scrubber system both from an economical and a technical point of view.

According to the process of the invention it should be obvious that it is not necessary to feed all the gases obtained in the oxidation to the scrubber for the recovery of the naphthoquinone formed. For instance, if the oxidation conditions used give rise to the formation of relatively large amounts of phthalic anhydride it is convenient to precool the vapors in a condenser system to a temperature approximately to the dew point of the naphthoquinone so as to separate the major part of the phthalic anhydride without any simultaneous separation of naphthoquinone or naphthalene provided that said latter substances are present in relatively low concentrations. The possible extent of this pre-precipitation can be calculated from Table 1, provided that the concentrations of the substances in the vapor mixture are known. Said concentrations are easy to determine by analysis. It is often possible to use lower temperatures than those defined in Table 1. This is due to the fact that part of the naphthoquinone precipitates as very small crystals which enter the scrubber as a dust and can be recovered therein.

If the yield of naphthoquinone is low which is often the case when said substance is formed as a byproduct in the manufacture of phthalic anhydride, the naphthalene concentration usually is low as well. In such cases a lower water temperature in the scrubber can be used without any risk of naphthalene precipitation.

When treating vapors which for instance originally contain 0.05 gram of naphthalene, 0.1 gram of naphthoquinone and 0.8 gram of phthalic anhydride per 30 grams of air it is thus suitable first to cool the vapors in a condenser system to a temperature of about 90° C. so that the gases leaving the condenser—according to Table 1—only contain about 0.2 gram of phthalic anhydride per 30 grams of air, the contents of naphthalene and naphthoquinone being unchanged. When said vapors are fed to a scrubber operating at a temperature of 30° C. the ratio between the amounts of naphthalene and naphthoquinone precipitated in the scrubber will be the following as can be seen from Table 4:

| | Percent |
|---|---|
| Naphthalene, 0.05—0.025=0.025 gram | 20 |
| Naphthoquinone, 0.1—0.002=0.1 gram | 80 |
| 0.125 gram | |

If the vapors, however, are diluted with an equivalent amount of air before they enter the scrubber the naphthalene content is lowered to 0.025 gram per 30 grams of air and—as can be seen from Table 4—a naphthalene-free product is obtained at a temperature of 30° C. A scrubber water temperature of 30° C. will therefore be a practical lower limit according to the invention.

TABLE 1

[Partial pressures (p mm. of Hg) and dew points (° C.) for naphthoquinone and phthalic anhydride at different concentrations]

| Grams per 30 grams of air | Naphthalene | | Naphthoquinone | | Phthalic anhydride | |
|---|---|---|---|---|---|---|
| | $p_c$ | ° C. | $p_n$ | ° C. | $p_f$ | ° C. |
| 0.003 | | | 0.014 | 40 | | |
| 0.015 | 0.085 | 22 | | | 0.07 | 40 |
| 0.05 | 0.28 | 40 | 0.23 | 81 | 0.24 | 66 |
| 0.1 | 0.565 | 49 | 0.46 | 90.5 | 0.49 | 79 |
| 0.2 | 1.13 | 57.5 | 0.92 | 101 | 0.98 | 92 |
| 0.3 | 1.695 | 62 | 1.375 | 105.5 | 1.47 | 99 |
| 0.4 | 2.26 | 66 | 1.835 | 108 | 1.955 | 105 |
| 0.5 | 2.82 | 69 | 2.29 | 112 | 2.44 | 110 |
| 0.6 | 3.39 | 71.5 | 2.75 | 115 | 2.93 | 114 |
| 0.7 | 3.95 | 73 | 3.25 | 118 | 3.42 | 117.5 |
| 0.8 | 4.52 | 74.5 | 3.67 | 120 | 3.91 | 120 |
| 0.9 | 5.08 | 76.5 | 4.13 | 121 | 4.40 | 123 |
| 1.0 | 5.65 | 77.5 | 4.59 | 122 | 4.89 | 125 |

TABLE 2

[Partial pressures (p mm. of Hg) and dew points (° C.) of naphthalene, naphthoquinone and phthalic anhydride in air at a water concentration obtained after passing the vapors through a scrubber at a temperature of 60° C. at varying concentrations of the products]

| Grams per 30 grams of air | Naphthalene | | Naphthoquinone | | Phthalic anhydride | |
|---|---|---|---|---|---|---|
| | $p_c$ | ° C. | $p_n$ | ° C. | $p_f$ | ° C. |
| 0.0135 | | | 0.05 | 60 | | |
| 0.02 | 0.09 | 24 | | | | |
| 0.05 | 0.23 | 38 | 0.19 | 80 | 0.20 | 61.5 |
| 0.1 | 0.46 | 47 | 0.37 | 88 | 0.40 | 75 |
| 0.2 | 0.92 | 54 | 0.74 | 98 | 0.79 | 89 |
| 0.3 | 1.38 | 59.5 | 1.115 | 104 | 1.19 | 96 |
| 0.4 | 1.835 | 63.5 | 1.49 | 106 | 1.59 | 101 |
| 0.5 | 2.295 | 66 | 1.86 | 108 | 1.985 | 105.5 |
| 0.6 | 2.755 | 68.5 | 2.23 | 111 | 2.38 | 109 |
| 0.7 | 3.21 | 70.5 | 2.60 | 114 | 2.78 | 113 |
| 0.8 | 3.67 | 72 | 2.97 | 116 | 3.175 | 117 |
| 0.9 | 4.125 | 74 | 3.34 | 118 | 3.57 | 118.5 |
| 1.0 | 4.58 | 75 | 3.72 | 120 | 3.97 | 121 |

TABLE 3

[Partial pressures (p mm. of Hg) and dew points (° C.) of naphthalene, naphthoquinone and phthalic anhydride in air at a water concentration obtained after passing the vapors through a scrubber at a temperature of 50° C. at varying concentrations of the products]

| Grams per 30 grams of air | Naphthalene | | Naphthoquinone | | Phthalic anhydride | |
|---|---|---|---|---|---|---|
| | $p_c$ | ° C. | $p_n$ | ° C. | $p_f$ | ° C. |
| 0.005 | | | 0.02 | 50 | | |
| 0.02 | 0.10 | 27 | 0.08 | 74 | | |
| 0.05 | 0.25 | 38 | 0.20 | 78 | | |
| 0.1 | 0.50 | 47 | 0.41 | 89 | 0.43 | 77 |
| 0.2 | 1.00 | 56 | 0.81 | 99 | 0.87 | 91 |
| 0.3 | 1.51 | 61 | 1.22 | 104 | 1.30 | 97.5 |
| 0.4 | 2.01 | 64.5 | 1.62 | 107 | 1.73 | 102 |
| 0.5 | 2.51 | 67.5 | 2.03 | 110 | 2.165 | 107 |
| 0.6 | 3.01 | 70 | 2.44 | 113 | 2.60 | 111 |
| 0.7 | 3.51 | 71.5 | 2.84 | 116 | 3.03 | 115 |
| 0.8 | 4.02 | 73 | 3.25 | 117.5 | 3.46 | 118 |
| 0.9 | 4.52 | 75 | 3.65 | 119.5 | 3.90 | 120 |
| 1.0 | 5.0 | 76 | 4.06 | 121 | 4.33 | 122 |

TABLE 4

[Partial pressures (p mm. of Hg) and dew points (° C.) of naphthalene naphthoquinone and phthalic anhydride in air at a water concentration obtained after passing the vapors through a scrubber at a temperature of 30° C. at varying concentrations of the products]

| Grams per 30 grams of air | Naphthalene | | Naphthoquinone | | Phthalic anhydride | |
|---|---|---|---|---|---|---|
| | $p_c$ | ° C. | $p_n$ | ° C. | $p_f$ | ° C. |
| 0.005 | 0.03 | -10 | 0.02 | 50 | 0.02 | 28 |
| 0.02 | 0.11 | 28 | 0.09 | 69 | 0.095 | 49 |
| 0.05 | 0.27 | 39 | 0.22 | 80 | 0.24 | 65 |
| 0.1 | 0.55 | 48.5 | 0.44 | 90 | 0.47 | 79 |
| 0.2 | 1.09 | 57 | 0.885 | 100 | 0.945 | 92 |
| 0.3 | 1.64 | 61.5 | 1.33 | 105.5 | 1.42 | 98.5 |
| 0.4 | 2.18 | 65.5 | 1.77 | 108.5 | 1.89 | 104 |
| 0.5 | 2.73 | 68.5 | 2.21 | 112 | 2.36 | 108.5 |
| 0.6 | 3.28 | 71 | 2.66 | 114 | 2.83 | 113 |
| 0.7 | 3.82 | 72.5 | 3.10 | 117 | 3.30 | 116.5 |
| 0.8 | 4.37 | 74 | 3.54 | 118 | 3.78 | 119.2 |
| 0.9 | 4.92 | 76 | 3.98 | 121 | 4.25 | 125 |
| 1.0 | 5.46 | 77 | 4.42 | 123 | 4.72 | 124.5 |

TABLE 5

[Solubility of phthalic acid in water at different temperatures]

| Degrees C.: | Solubility, grams/100 grams of $H_2O$ |
|---|---|
| 30 | 0.8 |
| 40 | 1.2 |
| 50 | 1.8 |
| 60 | 2.7 |
| 70 | 4.1 |
| 80 | 6.4 |

*Example.*—A conventional oxidation converter was fed with a vapor mixture containing 50 grams of naphthalene and 1,500 grams of air per hour. The yield of the reaction was approximately 18 percent by weight of naphthoquinone, 10 percent by weight of naphthalene and 60 percent by weight of phthalic anhydride calculated upon the naphthalene quantity charged. The experiment was carried out during eight hours. The vapor mixture leaving the reactor was first cooled in a condenser to about 100° C. and thereupon passed a water scrubber having a water temperature of about 60° C. The scrubber water was filtered continuously and the naphthoquinone was collected on the filter. The product which was substantially free from naphthalene (naphthalene content less than 1.5 percent by weight) weighed after drying 65 grams. In the condenser 100 grams of phthalic anhydride were recovered.

What I claim is:

1. A method of recovering naphthoquinone formed in the catalytic vapor phase oxidation of naphthalene comprising feeding the vapor mixture mainly consisting of naphthoquinone, phthalic anhydride, naphthalene, maleic anhydride, carbon dioxide, water, and the remainder of the gases used for the oxidation process, to a water scrubber with a water temperature not below 30° C. and not exceeding 75° C. and recovering the naphthoquinone precipitated from the scrubber water.

2. A method according to claim 1 in which the vapors leaving the water scrubber pass a cold water scrubber for recovering naphthalene.

3. A method according to claim 1 in which the vapors from the catalytic vapor phase oxidation of naphthalene first are cooled in a condenser system for recovering part of the phthalic anhydride and thereafter are passed through the scrubber system or systems for recovering naphthoquinone.

4. A method according to claim 2 in which the vapors from the catalytic vapor phase oxidation of naphthalene first are cooled in a condenser system for recovering part of the phthalic anhydride and thereafter are passed through the scrubber system or systems for recovering naphthoquinone.

References Cited

UNITED STATES PATENTS 2,536,833   1/1951   Bailey _____ 260—396

LORRAINE A. WEINBERGER, *Primary Examiner.*

L. ARNOLD THAXTON, *Assistant Examiner.*

U.S. Cl. X.R.

260—346.4, 346.8